Dec. 17, 1935.   O. W. LEE   2,024,376
DIAGNOSTIC LENS
Filed May 28, 1934   2 Sheets-Sheet 1

INVENTOR
Orval W. Lee

Dec. 17, 1935.  O. W. LEE  2,024,376
DIAGNOSTIC LENS
Filed May 28, 1934   2 Sheets-Sheet 2
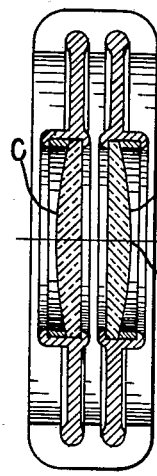
FIG. 4
PRIOR ART
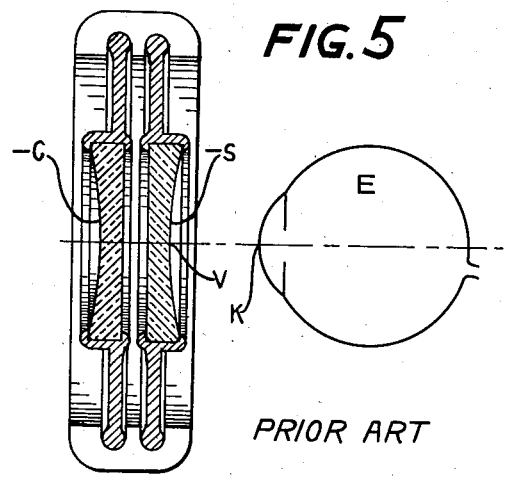
FIG. 5
PRIOR ART
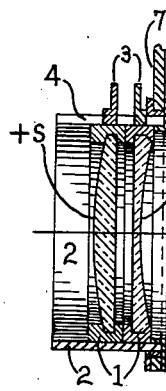
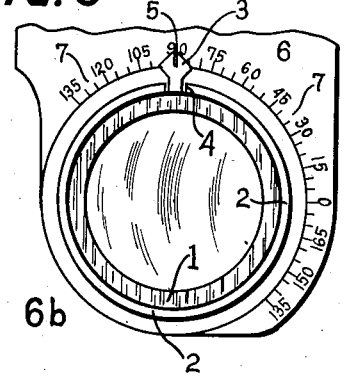
FIG. 6
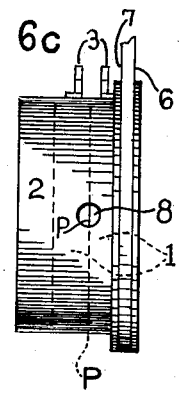
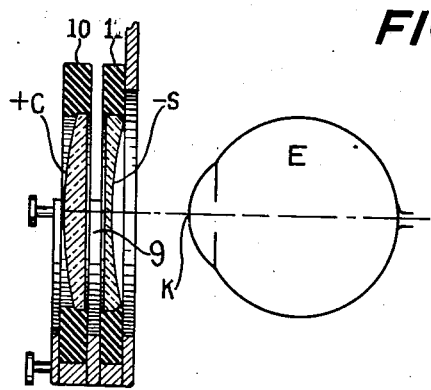
FIG. 7
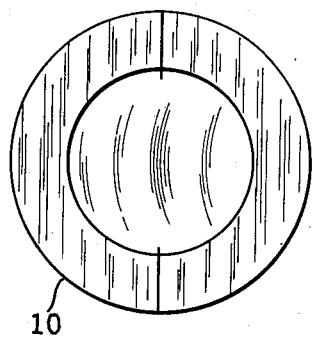
INVENTOR
Orval W. Lee Patented Dec. 17, 1935

2,024,376

UNITED STATES PATENT OFFICE 2,024,376

DIAGNOSTIC LENS

Orval W. Lee, Spokane, Wash.

Application May 28, 1934, Serial No. 727,873

15 Claims. (Cl. 88—22)

The present invention relates to improvements in diagnostic lenses used for the purpose of determining the refractive errors of the human eye, to accurately ascertain the effective focus of the required corrective lenses.

In carrying out my invention I provide a plurality of separate diagnostic lenses of different qualitative and quantitative properties. The lenses are of two distinct types, namely, plano-concave and plano-convex. Each lens is compensated to an effective focus measured from a designated plane or point adjacent the plano side of the lens in such a manner that when a plano-concave and a plano-convex are combined with their plano sides adjacent, the plane or point of the one coincides with the plane or point of the other, whereby the resultant effective focus of the combined lenses may be measured from a single plane or point situated intermediate the adjacent plano surfaces of the two combined lenses.

By employing the principles of my invention I eliminate the inaccuracies that are inherent in the conventional test-lenses and also eliminate the necessity of making all spherical lenses of the series of equal thickness, as is necessary in some improved test-lens sets. The plane or point from which the effective focus is measured is adjacent the plano surface of each lens and may be readily located by the practitioner. This plane or point is forward of the concave lenses and rearward of the convex lenses, whereby said plane or point may be made to coincide in lenses of equal and opposite effective focus and thereby neutralization of the effective focus of such lenses is made possible.

The plane or point from which the effective focus of each lens is measured is individual with each lens and is not dependent upon the principal plane of another lens differently situated, as is the case in test-lenses of the prior art.

The lenses are designed to combine, one with another, with a minimum of intervening space, thereby reducing to a minimum, such errors as may result from the interval between lenses.

The diagnostic lenses of my invention may be measured by the conventional unit of measurement, or they may be measured by an improved unit of my invention, hereinafter described.

My invention provides a means of determining the refractive errors of the human eye with a marked degree of exactitude and provides other advantages that are not otherwise obtainable. Diagnostic lenses involving the principles of my invention can be manufactured at a reasonable cost.

The invention resides in a series of diagnostic lenses of the character hereinafter disclosed and in the method of combining such lenses, together with an improved method of designating the effective focus of lenses used for ophthalmic purposes. It will be understood that the invention is not restricted to the exact embodiment herein illustrated and described but that modifications may be made in the disclosed structure without departing from the principles of the invention and the intent of the claims. In the accompanying drawings, I have illustrated the principles and physical embodiment of my invention.

Figures 4 and 5 illustrate improved test-lenses of the prior art.

Figure 6 shows three diagrams illustrating diagnostic lenses of my invention assembled in a trial frame or lens holder; Diagram 6a is a vertical section, 6b is a fractional front view and 6c is a side view.

Figure 7 illustrates a possible mode of assembling my diagnostic lenses in a trial frame and also shows a modified lens-cell.

In conventional test-lens sets, the spherical lenses are made double-convex or double-concave, and the cylindrical lenses are made plano-convex or plano-concave, and usually the lenses are 38 millimeters round. As a natural result, said lenses vary in center thickness from one millimeter to eight millimeters, and a corresponding variation in the thickness of the edge also results.

Figure 1:
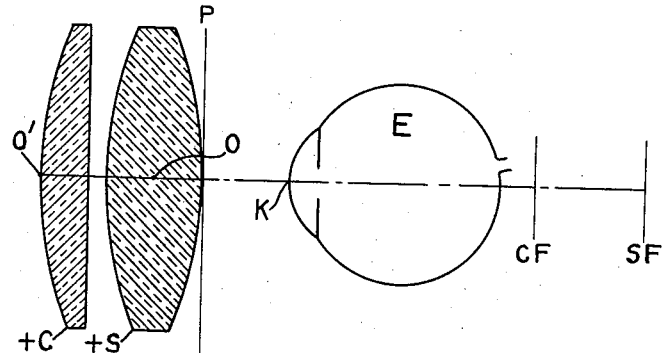
Figure 1 illustrates test-lenses of the prior art.

In Figure 1, I illustrate a double-convex spherical lens +S and a plano-convex cylindrical lens +C; the optical centers of the respective lenses being indicated at O and O'. It is a well known fact that the optical center of a double-convex or double-concave lens is situated within the lens and equally distant from the vertices of the two equally curved surfaces, as is indicated at O; and the optical center of a plano-convex or plano-concave lens is situated at the vertex of the curved surface, as is indicated at O'.

Precisely, the focal length of a lens is measured from the two principal points of the lens; however, in relatively thin plano-convex and plano-concave lenses the two principal points are practically coincident with the optical center; therefore, for convenience I have simplified the drawings by illustrating the optical center and omitting the principal points, which also permits of greater clearness in the description.

It will be seen in Figure 1, that the optical center of +S and the optical center of +C are separated by the distance O—O'. This distance O—O' is equal to the thickness of the lens +C, plus one half of the thickness of the lens +S, plus the separation of their adjacent surfaces. When the focal length of +S and the focal length of +C are equal, the focal points SF and CF will be separated by a distance equal to O—O'. It should also be observed that, when +S is placed forward of +C, or when the plano side of +C is placed forward, then the distance O—O' will be lessened to the extent of the thickness of +C. It should also be observed that when the lens +S is made plano convex and the plano surfaces of the two lenses placed adjacent, that the distance O—O' is thereby increased, due to the reason that O is then at the vertex of +S. In order to make the various conventional test-lenses of uniform diameter (usually 38 mm.); it is necessary to increase the center thickness of convex lenses as the dioptric value increases, and likewise increase the edge thickness of the concave lenses; which of course further separates O' and O. These variations in thickness and the absence of any rule for the relative position of spherical and cylindrical lenses, present discrepancies that are of consequence.

As an example, assume +S to be a +20.00 D. sphere of eight millimeters thickness and +C to be a +5.00 D. Cyl. of four millimeters thickness, the two lenses separated by a space of two millimeters, then the separation between O' and O is ten millimeters $$(4+2+\frac{8}{2}=10)$$

Ten millimeters is 20% of the focal length of a +20.00 D. lens and 5% of the focal length of a +5.00 D. lens. The importance of the location of the lens with relation to the eye has long been established. Therefore, the aforementioned difference of ten millimeters between the optical centers O' and O is obviously an important factor in the focal effect of the combined lenses +C and +S.

The ideal forms of test-lenses would be a plano-convex lens having both the spherical curve and the cylindrical curve on one and the same side, positioned with the plano surface adjacent the eye; and a plano-concave lens having both the spherical curve and the cylindrical curve on one and the same side, positioned with the concave surface adjacent the eye. In these forms of test-lenses the focal effect could readily and conveniently be measured from the vertex of the curved surface; but unfortunately the great multiplicity of lenses required renders the principle impractical in actual practice.

The location of the optical center and principal points is variable with different forms of lenses and it is not feasible to designate the focal length of lenses from any such points. For practical purposes it is essentially necessary to designate the effective focus of each lens from some standard plane that can be readily located by the practitioner.

Figure 2:
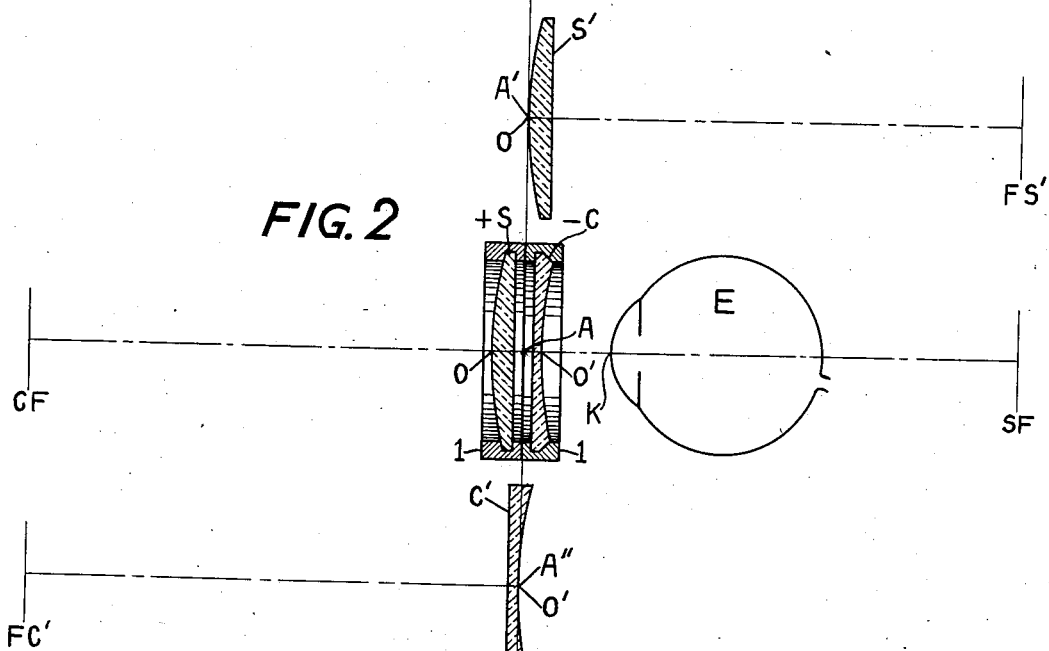
Figures 2 and 3 illustrate the nature and principles of the improved diagnostic lenses of my invention.

In the practical application of my improved diagnostic lenses, I designate the effective focus of each lens as the distance between its focal point and that plane of the lens-cell which is adjacent the plano side of the lens as is indicated at P—P in Figure 2, in which A is normal with P—P. For convenience and comparison I have extended the line P—P continuous through Figures 1, 2 and 3.

As shown in Figure 2, the effective focus of the spherical lens +S, is equal to A—SF, in contradistinction to its focal length O—SF'; the effective focus of the cylindrical lens —C is A—CF (negative), in contradistinction to its negative focal length O'—CF. That is to say; the spherical lens +S is made to have a focal effect, equivalent to a plano-convex sphere S' having its vertex situated at A' and of a focal length A'—FS' which is equal to A—SF. Likewise the cylindrical lens —C is made to have a focal effect equivalent to a plano-concave cylinder C' having its vertex situated at A'' and of a negative focal length A''—FC', which is equal to A—CF. Consequently, the effective focus of the lenses +S and —C combined, is the equivalent of a plano sphero-cylinder having its vertex situated at A and having a negative cylindrical focus A—CF and a spherical focus A—SF. Obviously, if A—SF and A—CF are equal, the cylindrical surface will neutralize one meridian of the spherical surface and the resultant will be the effect of a convex cylindrical lens having an effective focus A—SF.

Assume —C to be a plano-concave spherical lens having the effective focus A—CF and a focal length O'—CF; then —C is the equivalent of a plano-concave spherical lens having the vertex situated at A and of a negative spherical focus A—CF. Obviously, if A—SF and A—CF are equal, the two spherical surfaces will neutralize each other and the result will be plano or naught. It is of course understood, that a plano-convex lens and a plano-concave lens of equal focal length do not neutralize each other when the plano sides are adjacent; however, in this instance the focal length of the plano-convex O—SF and the focal length of the plano-concave is O'—CF (negative) and O—SF is greater than O'—CF, for the reason that O—A is greater than O'—A and consequently the dioptric power of the shorter negative focal length O'—CF is greater than the longer positive focal length O—SF and consequently said lenses do neutralize.

It is generally known that the dioptric power of a lens is variously affected by the curvature of form and by thickness when the index of refraction is constant and there is a vast difference between effective focus and that focal length which is measured from the optical center, or the principal points of a lens. Therefore it will be understood that the neutralization described in the previous paragraph is a neutralization of effective focus and not a neutralization of dioptric power nor of focal length.

The terms dioptric power and focal length are vague, unless further qualified by additional information. "Power" or "strength" are in themselves misnomers as relates to ophthalmic lenses. The dioptric unit of measure is far too gross for ophthalmic purposes. As will be shown later, I have invented an improved method for designating the effective focus of ophthalmic lenses.

Figure 3:
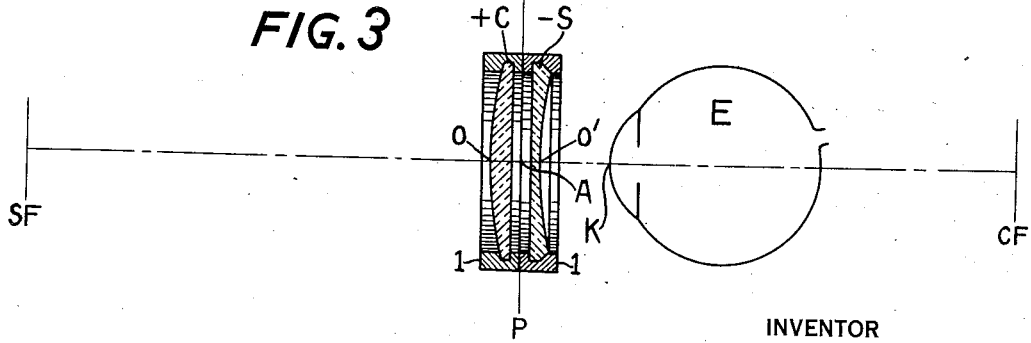

In Figure 3, I show a plano-convex cylindrical lens +C combined with a plano-concave spherical lens —S and it will be seen that these lenses bear the same relation to each other as do the lenses more graphically illustrated in Figure 2 and which have been fully explained.

As shown in Figures 2 and 3 the diagnostic lenses, according to my invention are invariably placed with the concave surface nearest the eye, as for instance the plano-concave cylindrical —C and plano-concave spherical —S; and the plano-convex lenses, according to my invention, are invariably placed with the plano surface nearest the eye and the convex surface opposite thereto; as for instance the plano-convex spherical +S and the plano-convex cylindrical +C. The effective focus of all such lenses is measured from the plane of contact P—P of the lens-cells or rims, if and when combined in the manner illustrated and described and measured from the plane of the lens-cell on the plano side when employed singly. The combination is invariably a concave with a convex or vice versa, the concave surface is invariably placed nearest the eye and the convex is invariably placed opposite the eye, multiples of concave lenses, nor multiples of convex lenses are not employed in combination; observance of these details being essential to the correct valuation of the focal effect of the lenses.

It can be readily demonstrated that when the convex surface is placed nearest the eye, there is marginal distortion in a plano-convex lens, if the lens is farther from the object than from the eye, which is the situation in which all ophthalmic lenses are used. This distortion is eliminated when the plano side is placed nearest the eye. In contradistinction, when the lens is farther from the eye than from the object, there is marginal distortion when the plano side is nearest the eye. Ophthalmic lenses are used in close proximity to the eye and therefore the convex side should not be placed nearest the eye.

In Figure 4, I show test-lenses of the prior art, in which the several lenses of the series are compensated to an effective focus measured from the common plane of the rear vertex V of the spherical lenses. Necessarily, the lens nearest the eye is invariably a spherical lens without regard to whether the surface is convex or concave. Consequently, the aforementioned distortion is not avoided in the convex spheres which are placed with the convex surface nearest the eye to provide the common plane of the rear vertex V. In this form of test-lenses, it is necessary to make all of the spherical lenses of uniform center thickness to maintain the constant plane from which the lenses are measured. Consequently, the center thickness of a minus 20.00 D. sphere must be equal to the center thickness of a plus 20.00 D. sphere, which necessitates restricting the lenses to a small diameter to prevent undue thickness at the edge of the greater minus spheres. The effective focus is measured from the rear vertex V of the spherical lens nearest the eye, which of course, in concave lenses is inaccessible and the practitioner is dependent upon the accuracy of an indicating mark on the trial frame, to determine the position of the vertex of the concave spheres. Since the spherical lenses have an effective focus measured backward from the vertex V of the curved surface, they do not neutralize each other. Since the cylindrical lenses are compensated to an effective focus measured backward from the rear vertex V of the spherical lenses, said cylindrical lenses do not neutralize each other. Consequently the practitioner is dependent upon the accuracy of the manufacturer and is without means to prove the absence of errors in such lenses, except by resorting to the expensive devices of the manufacturer and again he has no means of proving the correctness of such devices. Furthermore, he can not prove the correctness of the ophthalmic lenses made in accordance with such test-lenses, except by the aforementioned devices.

The diagnostic lenses of my invention have an effective focus measured from the plane therebetween, independent of the dioptric value or focal length; the convex and concave cylindricals do neutralize each other; the convex and concave sphericals do neutralize each other and the practitioner has absolute proof of the equality of the effective focus of the concave and convex lenses, both spherical and cylindrical, without expenditure.

The location of the lens before the eye is important and it is necessary to provide means for measuring the distance from the corneal apex K, to that point or plane from which the effective focus of each lens or described combination of lenses is measured; that the corrective lenses may thereby be properly positioned at the same relative distance; whereby the effective focus of the corrective lenses will correspond to the effective focus of the diagnostic lenses. In actual practice it is more practical to determine the distance at which the corrective lenses will necessarily be located and thereupon conduct the examination with the diagnostic lenses situated accordingly.

My method of determining this distance is most simple. As previously shown, the effective focus is measured from the plane of the lens-cell adjacent the plano side of each lens and the plano sides are adjacent to each other when combined; consequently, the two planes coincide and it is a simple procedure to measure the distance between the corneal apex K and the coinciding planes of the two lens-cells. This may be accomplished with any convenient gage or rule, or I may provide a gage that can be interchangeably used with the diagnostic lenses and the finished glasses. Obviously, there is no advantage in attaching a gauge to the test-lens frame, unless a like gauge is provided for measuring the same distance relative to the finished glasses.

In the practical application of the diagnostic lenses of my invention, I prefer to make them of a uniform size of approximately 25 millimeters diameter. This size is ample and presents many advantages. Lenses of such size are much lighter in weight than 38 millimeter lenses, additional area is provided on the lens holding device or trial frame, whereby the protractor scale need not be unduly large nor the lens holding device cumbersome. Lenses of this size may be adjusted to the narrow interpupillary distance so often necessary with juvenile patients, a feature which is sometimes impossible with larger lenses. Furthermore, the more convex lenses can be reduced in center thickness and the thick edge of the greater concave lenses is also avoided.

Each lens is provided with a retaining cell comprising an annular ring 1, the circumference of which suffices to hold the lens in position by frictional engagement within the tubular sleeve 2 shown in Figure 6. Each rim may be provided with a handle 3 for convenience in positioning the lenses in the sleeve 2 that is provided with a slot 4 to admit the handle 3. This handle is provided with a notch or line 5 to indicate the axis of the cylindrical lens and each cylindrical lens is rigidly mounted in the lens-cell with the axis coincident with the indicator 5.

Each lens may be held in its cell in any commercially practical manner, as for instance by spinning the metal to contact the lens or by means of any plastic mould material, or by means of any material having a lower melting point than the lens.

Since the effective focus of each lens is measured from the plane of the lens-cell on the plano-side of the lens, it is not essentially necessary to make all lenses of the same center thickness and preferably they are made of the least thickness practical. The concave lenses should be made much thinner than the convex lenses and the lesser convex lenses should be made much thinner than the greater convex lenses. The plano surface of the several lenses is preferably situated at a uniform distance from the plane of the lens-cell and such distance should be a practical minimum. Preferably the rims are of such width, that in each instance no part of the lens protrudes beyond the plane of the rim, whereby the lens surfaces do not contact any flat surface upon which the lens-cell may be occasionally laid and whereby abrasions of the lenses are avoided. The rims may be of two or more different widths in groups of uniform width as may be practical. For the convenience of spacing, empty rims or rims containing a blank may be provided.

In Figure 6, I show one holder of my improved trial frame, Diagram 6a showing a vertical section, 6b showing a front view and 6c showing a side view. The diagnostic lenses are held in proper alignment within the tubular sleeve 2, that is rotatably mounted in the frame portion 6, concentric with a protractor scale that is indicated at 7. The sleeve 2 is devoid of grooves or ribs, the lens-cells 1, 1, being retained in position by means of frictional engagement with the inner surface of the sleeve 2. All lugs, posts, retaining springs, gearings, lens pockets and structures intervening between the lens-cells, as are common to the usual trial frames or test-lens holders, are dispensed with and the lens-cells or rings are placed in absolute contact one with the other. The handles 3, 3 protrude through the slot 4 and the line or notch 5 indicates on the protractor scale 7 the position of the axis of the cylindrical lens, each of which is rigid in the lens-cell with the cylinder axis coincident with the diameter indicated by the line or notch 5. A small aperture 8 permits a view of the plane P from which the effective focus of the lenses is measured. The trial frame, of course, is provided with the necessary means of support and adjustment that adapt it for the purpose intended.

In the foregoing description the diagnostic lenses have been illustrated and described as having an effective focus measured from the plane of the lens-cell on the plano side of the lens, whereby the plane or point from which the effective focus of each lens is measured, coincides when two lenses are combined with plano sides adjacent. However, I wish to have it understood that I may adapt the diagnostic lenses to a trial frame of the type shown in Figure 7. In this instance, the concave spherical and cylindrical lenses, are placed rearward of a separating ring 9 and the convex spherical and cylindrical lenses are placed forward of said ring, thereby separating the lenses by a constant measurement, in which case appropriate modifications may be made in the lens-cells and in the location of the designated plane or point from which the effective focus of the lenses is measured and the lenses compensated accordingly.

Obviously, the common plane of the rearwardly situated lenses may be either the forward face of their respective lens-cells or may be at the uniformly situated optical center of the several concave spheres and cylinders; as for instance, in Fig. 2 and Fig. 3 the common plane may be P—P; or the common plane may coincide with the uniformly disposed optical centers of —C in Fig. 2 and —S in Fig. 3, as will be readily understood.

It will also be obvious that bi-concave spheres may be employed where a short radius of curvature is required and thus simplify the uniform positioning of the concave lenses to a common plane relative to their respective lens-cells and thus enable the lens-cells to be made the least thickness practical, and preferably of uniform thickness, as is quite conveniently possible and practical, as well as most advantageous.

It is conveniently possible to construct the lenses of the present invention of the full size generally used with the conventional trial frame which is usually adapted to receive lenses 38 millimeters in diameter. To illustrate, cylindrical lenses usually do not exceed 6 diopters and it is conveniently possible to make a 6 diopter concave cylindrical lens of 38 millimeter diameter with an edge thickness of 3 millimeters, which is an appropriate thickness readily adaptable to the spring clip of the conventional trial frame. The concave spherical lenses exceeding 6 diopters can conveniently be made in what is generally termed "lenticular" form; that is to say, the refractive surface thereof may be bordered by a plano margin and thus restrict the edge thickness of the greater concave spheres to the edge thickness of the most concave cylinder, whereby the most concave lens will be readily adaptable to the spring clips of the conventional trial frame without malposition of the lens which may be positioned anteriorly thereof in the secondary spring clips which are conventional on most trial frames. Of course, the more concave spheres may be of a higher index and thus increase the diameter of the refractive surface as will be readily understood by those skilled in the art. The forwardly positioned lenses being invariably convex and having their curved surfaces forwardly disposed, the contour and thickness thereof presents no problem and it suffices to appropriately position them in their respective lens-cells so that when they are engaged with the usual spring clips of the conventional trial frame that the lens-cells thereof will contact the lens-cell of any concave sphere or concave cylinder with which they may be combined in the conventional trial frame. From this description it will be clear that the lenses of the present invention are not restricted to my particular diameter and are readily adaptable to various modes of manufacture, without unusual inconvenience or expense.

When the lenses are made of the diameter just described, there is no problem of locating the relative rotation of the axis of the rearwardly disposed concave cylindrical lens, as the axis of each cylindrical lens may be indicated by suitable marking on the forward plano surface thereof in the usual manner; and of course this marking will be readily visible through the lens disposed forwardly thereof.

When the lenses are of smaller diameter and positioned in perforate discs such as is illustrated at 10 in Figure 7, there is considerable problem of conveniently locating the relative rotation of the axis of the rearwardly disposed concave cylindrical lens, due to the fact that the forwardly disposed disc obscures the rearwardly disposed disc and the axis marking on the face thereof. The solution of this problem is made the subject of a separate application Serial No. 35,120 filed August 7, 1935.

There are a number of disadvantages in the present system of designating the dioptric power of lenses, all of which are eliminated by an improved method of my invention. Due to the discrepancy existing between the focal divisions of lenses and the focal distance existing at the time of determining the refraction of the eye no means is provided for compensating for this difference of focal length. It is the universal custom to divide the dioptric unit of lenses into half, quarter and eighth of one diopter. It is the common practice to determine the refraction of the eye at a distance of 6 meters and of course at the completion of the examination, the eye is artificially myopic to the extent of one sixth of one diopter. Manifestly, a compensation of one sixth of one diopter should be made to correct such condition; but unfortunately, the present dioptric divisions do not provide a lens of such fractional denomination. In some instances the dimensions of the examination room necessitate determining the refraction at a distance of 5 meters and again the present dioptric divisions do not provide a lens of such fractional denominations as one fifth of one diopter. The present dioptric divisions provide a lens of one quarter of one diopter; but unfortunately, when the refraction is determined at a distance of 4 meters, any unavoidable percentage of error in determining the refraction, is of greater consequence. A lens of one eighth of one diopter is also available; but unfortunately the cost of office space and the limited dimensions of rooms in modern office buildings usually renders such examination distance of 8 meters either unobtainable or unfeasible.

The dioptric unit being large necessitates the use of both multiples and decimal parts of the unit, with the resulting inconvenience of two naughts following the decimal point of whole numbers and the incorrectness of omitting the numeral 5 in the third decimal place of one eighth divisions of the unit. The intermingling of common fractions into the decimal system and the verbal expressions commonly used to designate such lenses often present confusion; as for instance a 3.00 diopter lens is spoken of as a "three"; one quarter diopter, as a "twenty five" and one eighth diopter as a "twelve"; thus providing no distinction between decimals and units and with utter disregard of the fact that the system contains both 12.00 diopter and .12 diopter lenses. Also the large unit does not convey the proper impression to the uninformed; the average layman is inclined to consider a refractive error of three diopters as indeed minor and does not comprehend the magnitude of any refractive error.

To obviate these disadvantages I have invented a new and original method of designating the refractive effect of ophthalmic lenses. My method has the advantage of a small unit of measurement requiring no subdivisions, the focal value of each lens being designated by whole numbers. I use as a unit of measurement, a lens having an effective focus of precisely 1000 centimeters. This unit is the least refractive effect necessary for ophthalmic purposes and is less than the least refractive effect now in general use. The effective focus of each lens being the inverse of its focal unit designation, the effective focus of any multiple of the focal unit may be computed by dividing the unit of measurement 1000 centimeters by the focal unit designation of the lens and conversely the focal unit designation of any lens may be computed by dividing the unit of measurement 1000 centimeters by the effective focus of the lense.

I prefer to entitle my unit of measurement an ophthalmic focal unit, abbreviated O. F. U. As applied to my diagnostic lenses, a lens of (1) one O. F. U. has an effective focus of 1000 centimeters, measured from the plane adjacent to the plano side of the lens as previously described. As applied to ophthalmic lenses for spectacles and eyeglasses, a lens of (1) one O. F. U. has an effective focus of 1000 centimeters, measured from the vertex of the convex side of the lens or from the side farthest from the eye. The vertex of the convex side of a lens is more readily accessible than the vertex of the concave side and consequently the distance from the convex vertex to the apex of the cornea can be more readily measured than if the vertex of the concave side were used as a basis.

By the use of this method of designation, lenses ranging from an effective focus of 1000 centimeters to an effective focus of 4 centimeters are designated by whole numbers ranging from 1 to 250 and the smallest intervals necessary can be designated without the use of decimals or common fractions. These focal unit designations can be written and spoken with ease and without conflict of meaning. The uninformed layman can readily be made to understand that when an eye requires a lens of 10 focal units, that such eye when unaided, exerts 10 times the normal focal effort to see distinctly at the reasonable distance of 10 meters or approximately 33 feet; and that each multiple of the focal unit represents that such eye when unaided exerts that multiple of normal focal effort to see distinctly at the unit distance and of course if the eye is unable to compensate for the refractive error, vision will be indistinct. This method of designating focal effect provides smaller intervals of refractive effect than are now in common use and does not necessitate the use of either common fractions nor decimals. The unit divisions from 1 to 10 being approximately equivalent to tenths of one diopter of the present system they are of great advantage in accurately correcting errors of refraction of minor magnitude. The examination distance of 5 meters being readily obtainable in the average office by the means of mirror reflection of the test-media, such distance may be adopted as the usual distance of determining the refractive errors of the eye; and the resultant myopia equivalent to approximately one fifth of one diopter in the present system, corrected by a compensation of 2 focal units of the method of my invention. Should the examiner be fortunate enough to provide an examination distance of 10 meters a compensation of 1 focal unit will suffice.

It is the universal custom to designate the focus and position of cylindrical lenses, with references to the axis or non-refractive meridian of the cylindrical lens and consequently the axis of the cylinder must be placed at right angles to the meridian of the eye in which the cylindrical error exists. To correct this illogical method and the countless errors that have resulted from its employment, I have invented a new and improved method of designating the effective focus of cylindrical lenses. My improved method consists in designating the effective focus of all cylindrical lenses with reference to the refractive median, that is to say, on that line which would encompass the cylinder if it were a complete cylinder. According to my improved method the median of the cylindrical lens is placed in correspondence with the meridian of the eye in which the cylindrical error exists. This method of placing the median of the cylindrical lens in that position in which its refractive effect is required is not only most convenient, but it is also more logical and scientific. A further advantage is that when the median of a cylindrical lens is determined by observance of the inherent property of a cylindrical lens to produce rotary displacement of a straight line, a sharp image of said straight line is obtained on the refractive median of considerably convex cylindrical lenses at a distance at which the same line is very indistinct when viewed on the axis of the same lens. In determining the median of considerably concave cylindrical lenses by the same method, a line appears of normal width when viewed on the refractive median of the cylindrical lens and decidedly narrowed when viewed on the axis of the lens. These phenomena abate the accuracy of locating the axis of a cylindrical lens even of minor curvature and facilitate locating of the refractive median; consequently the median of any cylindrical lens can be located with greater exactitude than the axis. Obviously my improved method of designating the effective focus of cylindrical lenses with reference to the refractive median, enhances the accuracy of ophthalmic procedure.

As an example of the practical application and use of the diagnostic lenses of my invention the oculist or optometrist has at instant command a multiplicity of both concave and convex spherical and cylindrical lenses, that are free from the discrepancies and inaptitudes of the prior art. With these diagnostic lenses it is possible to determine errors of refraction with exactitude. Due to the method of combining and compensating the lenses, the practitioner may readily determine by neutralization, that the concave lenses have been equally compensated with the convex lenses. Due to this novel method of combining and compensating the lenses, any required sphero-cylinder combination may be attained and its focal planes located with exactitude in their relation to a single designated plane of the combined lenses, and in their relation to the eye; whereby the corrective lenses may be properly compensated and adjusted, to accurately correct the error of refraction determined by the use of the diagnostic lenses. By the use of my improved method, the effective focus of lenses may be conveniently designated in a much more comprehensive and appropriate manner than heretofore. By my improved method, each cylindrical lens is measured by the effective focus of its median and the practitioner may conveniently position the median of the cylinder coincident with the defective meridian of the eye without the inconvenience of placing the axis at right-angles thereto as heretofore. The combined improvements of my invention provide the practitioner with a greater aptitude than is obtainable by other methods and enables him to render a more efficient service to humanity.

In the invention herein disclosed, what I claim as new and desire to secure by Letters Patent of the United States is:

1. Apparatus for determining refractive errors of the human eye, comprising a plurality of plano-concave spherical lenses and a plurality of plano-concave cylindrical lenses, each lens having a specified dioptric value measured from the second principal point of the lens when the concave surface thereof is adjacent the eye, a plurality of plano-convex spherical lenses and a plurality of plano-convex cylindrical lenses, means for alternately positioning each of said convex lenses forwardly of each of said concave lenses with the center of curvature of each of the combined lenses in the direction of the eye, means for assuring a uniform interval between the second principal point of a selected one of said convex lenses and the second principal point of each of said concave lenses with which it may be combined in the manner aforesaid, each of said convex lenses having its focal length increased by an amount equal to the aforesaid interval of that particular convex lens when combined as aforesaid, the dioptric value of each of said convex lenses being specified in terms of the dioptric distance between its focal plane and the second principal point of any one of said concave lenses with which it may be combined as aforesaid, whereby when one of said convex spherical lenses is combined in the manner aforesaid with one of said concave spherical lenses having the same specified dioptric value the resultant will be naught, irrespective of the difference in the actual focal lengths thereof, and when one of said convex cylindrical lenses is combined in the manner aforesaid with one of said concave cylindrical lenses having the same specified dioptric value the resultant will be naught when both of said cylindrical lenses are positioned at the same axis.

2. Apparatus for determining refractive errors of the human eye, comprising a series of plano-concave spherical lenses and a series of plano-concave cylindrical lenses, a lens-cell for each lens aforesaid, the face of said lens-cell projecting beyond the plano side of the lens therein and the optical centers of all lenses in each of said series being uniformly situated relative to said face of the several lens-cells, each lens aforesaid having a designated dioptric value measured from said face of its lens-cell when the concave side of such lens is towards the eye; and comprising a series of plano-convex spherical lenses and a series of plano-convex cylindrical lenses, a lens-cell for each lens, the face of said lens-cell projecting beyond the plano-side of the lens therein and each lens having a designated dioptric value measured from said face of its lens-cell when the convex side of such lens is opposite the eye; whereby, when any one of said convex lenses is positioned anteriorly of any one of said concave lenses, with their plano sides adjacent and with the lens-cells thereof in contact, the aforementioned faces will coincide, and the refractive effect at said point of coincidence will be equivalent to the algebraic sum of the designated dioptric values of said convex lens thus combined with said concave lens.

3. Apparatus for determining refractive errors of the human eye, comprising a tubular sleeve rotatably and concentrically mounted in a protractor scale member, said sleeve having a longitudinal slot; a plurality of separate lenses each contained in a rim adapted to frictionally engage within said slotted sleeve, each rim aforesaid having a handle adapted to be engaged in the aforementioned slot, an indicating mark on each handle aforesaid, for indicating the position of the axis of the cylindrical lens therein, when the latter is positioned within said sleeve and rotated within the aforementioned protractor scale, the axis of each of the several cylindrical lenses being held in uniform relation to said indicating mark on the handle of their respective lens-cells.

4. Apparatus for determining refractive errors of the human eye, comprising a series of planoconcave spherical lenses and a series of planoconcave cylindrical lenses, a lens-cell for each lens, the face of said lens-cell projecting beyond the plano side of the lens therein and the optical centers of said lenses being uniformly situated relative to said faces of the several lens-cells, each lens having a designated dioptric value measured from the plane of the front face of its lens-cell when the concave side of such lens is towards the eye; and comprising a series of plano-convex spherical lenses and a series of plano-convex cylindrical lenses, a lens-cell for each lens, the face of said lens-cell projecting beyond the plano side of the lens therein and each lens having a designated dioptric value measured from the plane of the back face of its lens-cell when the convex side of such lens is opposite the eye; a lens holding device having a tubular sleeve rotatably and concentrically mounted in a protractor scale member, said sleeve having a longitudinal slot and each of said lens-cells having a projecting handle for engagement therein, each of said lens-cells being adapted to frictionally engage within said tubular sleeve; whereby said lenses may be interchangeably positioned within said sleeve and whereby any one of said convex lenses may be positioned anteriorly of any one of said concave lenses, in the previously described positions with their lens-cells in contact; an aperture in said rotatable sleeve; whereby, when said assembly is positioned before an eye, the distance between the corneal apex of such eye and said contacting faces of the lens-cells selectively positioned within said sleeve may be measured with any suitable gauge or rule; each cylindrical lens being rigidly mounted in its respective lens-cell with the cylindrical axis thereof coincident with the diameter indicated by a mark on the aforementioned handle, whereby said mark indicates the position of the axis of the respective cylindrical lens, when said tubular sleeve is rotated within said protractor scale member.

5. Apparatus for determining refractive errors of the human eye comprising a number of planoconcave spherical lenses, plano-concave cylindrical lenses, plano-convex spherical lenses and plano-convex cylindrical lenses, a lens holding device including means to interchangeably retain each of said concave lenses in uniform position with the curved surface invariably rearward and with the respective vertices uniformly positioned, and including means to interchangeably retain each of said convex lenses in uniform spaced relation with and anterior of each of said concave lenses and with the curved surface of each convex lens invariably forward, each of said convex lenses having its focal length increased by an amount equal to the interval between said uniform position of the respective vertices of said concave lenses and the second principal point of that particular convex lens, said interval being individual with each convex lens and independent of the interval of any other convex lens, whereby the interval of a certain convex lens is constant when interchangeably combined with the several aforesaid concave lenses but different from the constant interval of other aforesaid convex lenses, the dioptric value of each of said concave lenses being designated in terms of its actual focal length and the dioptric value of each of said convex lenses being designated in terms of the dioptric distance between its focal plane and said uniform position of the respective vertices of the concave lenses when combined therewith, whereby when one of said concave spherical lenses and one of said convex spherical lenses having the same designated dioptric value are positioned in said holder in the manner aforesaid, their focal planes will coincide and the resultant will be naught, and when one of said concave cylindrical lenses and one of said convex cylindrical lenses having the same designated dioptric value are positioned in said holder in the manner aforesaid, their focal planes will coincide and the resultant will be naught when said cylindrical lenses are both positioned at the same axis.

6. Apparatus for determining refractive errors of the human eye, comprising a number of plano-concave spherical lenses and a number of plano-concave cylindrical lenses, a lens-cell for each of said concave lenses, each of said lenses being mounted in its lens-cell with their respective vertices positioned at a uniform distance from that face of the lens-cell adjacent the plano side of the lens, a number of planoconvex spherical lenses and a number of plano-convex cylindrical lenses, a lens-cell for each of said convex lenses, each of said convex lenses being adapted to be alternately combined with and forwardly of each of said concave lenses, with the center of curvature of each concave lens and each convex lens in the direction of the eye and with the lens-cells in contact, each concave lens and each convex lens having a focal plane situated at a specified dioptric distance from that side of the lens-cell adjacent the plano side of the lens, whereby when one of said convex spherical lenses is combined as aforesaid with one of said concave spherical lenses having its focal plane situated at the same dioptric distance the resultant will be naught, and when one of said convex cylindrical lenses is combined as aforesaid with one of said concave cylindrical lenses having its focal plane situated at the same dioptric distance the resultant will be naught when said cylindrical lenses are both positioned at the same axis.

7. Apparatus for determining refractive errors of the human eye, including plano-concave spherical lenses and plano-concave cylindrical lenses, means for alternately positioning each of said concave lenses before the eye with the concave side thereof nearest to the eye, the specified dioptric value of each of said concave lenses being its actual focal length, and including plano-convex spherical lenses and planoconvex cylindrical lenses, means for alternately positioning a selected one of said convex lenses anterior of each of said concave lenses and at a spaced interval from the vertex of the concave lens uniform in the several instances and with the curved surface of the convex lens opposite the eye, the specified dioptric value of each of said convex lenses being the dioptric distance between its focal plane and the vertex of any one of said concave lenses with which it may be combined in the manner aforesaid, whereby when one of said concave spherical lenses is combined as aforesaid with one of said convex spherical lenses having the same specified dioptric value the resultant is naught, and when one of said concave cylindrical lenses is combined with one of said convex cylindrical lenses having the same specified dioptric value, the resultant is naught when said cylindrical lenses are both positioned at the same axis.

8. Apparatus for determining refractive errors of the human eye, comprising a number of anterior lens-cells and a number of posterior lens-cells adapted to be alternately positioned before the eye with their respective faces invariably in the same direction relative to the eye, and each anterior lens-cell being adapted to be alternately positioned in contact with each of said posterior lens-cells; whereby said contacting faces constitute a common plane when said lens-cells are thus combined; a lens mounted in each of said lens-cells and so located with relation to said common plane that its focal point will be situated at the same distance from said common plane as the focal point of a single optical surface of specified dioptric value having its vertex situated at said common plane; the front face of said posterior lens-cell being uniformly situated relative to the second principal point of the respective lenses therein; whereby, the resultant of two lenses combined in the aforesaid manner is equal to the algebraic sum of their specified dioptric values in terms of a single optical surface having its vertex situated at said common plane.

9. Apparatus for determining refractive errors of the human eye, comprising a number of cell contained lenses having their respective second principal points situated in a uniformly disposed plane common to the several lens-cells thereof, and comprising a number of cell contained lenses each adapted to be alternately positioned forwardly of each of the aforesaid lens-cells and with the same respective faces of the latter lens-cells in contact with the same respective faces of the former lens-cells; whereby, the relative situation of any one of the latter lenses will be constant when alternately combined as aforesaid with each of the former lenses; each of the former and latter lenses having a focal length equivalent to a single optical surface of specified dioptric value having its vertex situated at the aforesaid common plane.

10. Apparatus for determining refractive errors of the human eye, comprising a number of anterior lens-cells and a number of posterior lens-cells, adapted to be positioned before the eye with the same side forward in each instance; and each of said anterior lens-cells being adapted to be alternately combined with each of said posterior lens-cells with the back face of said anterior lens-cell in contact with the front face of said posterior lens-cell, a series of plano-concave spherical lenses and a series of plano-concave cylindrical lenses individually mounted in said posterior lens-cells with the center of curvature of each of said lenses situated rearwardly of its respective lens-cell; whereby, the second principal point, the optical center and the vertex of any one of said concave lenses will in fact coincide; and said coinciding points of each of said lenses respectively, being situated at a uniform distance from the front face of said posterior lens-cells respectively, thereby constituting a common plane relative to said posterior lens-cells and the lenses therein; a series of plano-convex spherical lenses and a series of plano-convex cylindrical lenses individually mounted in said anterior lens-cells with the center of curvature of each of said lenses situated rearwardly of its respective lens-cell; each of said convex lenses having its focal length increased by an amount equal to the interval between the second principal point thereof and the common plane of the aforesaid concave lenses when that anterior lens-cell is in contact with any one of the aforesaid posterior lens-cells in the aforementioned relative positions.

11. Apparatus for determining refractive errors of the human eye, comprising a series of plano-concave spherical lenses and a series of plano-concave cylindrical lenses; means for alternately positioning each of said lenses before the eye, with the center of curvature thereof in the direction of the eye, each of said lenses being mounted in a lens-cell with the optical center thereof at a uniform distance from the front face of the lens-cell in the several instances and each of said lenses having its focal length altered by an amount equal to the interval between the optical center thereof and the front face of its lens-cell, to produce the equivalent of a specified dioptric value of a single optical surface having the vertex thereof situated at the front face of said lens-cell; and comprising a series of plano-convex spherical lenses and a series of plano-convex cylindrical lenses, means for alternately positioning each of said lenses before the eye, with the center of curvature thereof in the direction of the eye, each of said lenses being mounted in a lens-cell and each of said lenses having a focal length exceeding a specified dioptric value by an amount equal to the interval between the second principal point thereof and the rear face of its lens-cell, to produce the equivalent of a specified dioptric value of a single optical surface having the vertex thereof situated at the rear face of that lens-cell; means for alternately positioning each of said convex lenses forwardly of each of said concave lenses with the center of curvature of each lens invariably in the direction of the eye as aforesaid and with the rear face of the forwardly situated lens-cell in contact with the front face of the rearwardly situated lens-cell; whereby, when such lenses are thus combined, the resultant is equivalent to a single optical surface having its vertex situated at the plane of contact and having a dioptric value equivalent to the algebraic sum of the specified dioptric values of the lenses thus combined.

12. Apparatus for determining refractive errors of the human eye, comprising a plurality of plano-concave spherical lenses, plano-concave cylindrical lenses, plano-convex spherical lenses and plano-convex cylindrical lenses; individual lens-cells for each of said lenses; the vertex of said concave lenses being uniformly disposed in the several lens-cells; said lens-cells being adapted to be interchangeably positioned before the eye, with the lens-cells in contact and with the concave lens invariably posterior and the convex lens invariably anterior and with the center of curvature of each lens in the direction of the eye; whereby, the plane of contact of the combined lens-cells constitutes a uniform common plane when a concave lens is combined with a convex lens in the manner aforesaid; each of said lenses having that radius of curvature required to produce the equivalent of a specified dioptric value of a single optical surface having its vertex situated at said common plane and its focal point situated at the focal point of the representative lens; whereby, when one of said spherical lenses is combined with one of said cylindrical lenses in the manner aforesaid, the resultant is equivalent to a compound optical surface having its vertex situated at said common plane and having a dioptric value equivalent to the algebraic sum of the specified dioptric values of said representative lenses thus combined.

13. Apparatus for determining refractive errors of the human eye, comprising a series of concave spherical lenses and a series of concave cylindrical lenses individually mounted in separate lens-cells, said lens-cells being adapted to be positioned before the eye with the same side invariably forward and the interval between said forward side of the lens-cell and the second principal point of the lens therein being uniform throughout both of the aforesaid series of lenses; a series of convex spherical lenses and a series of convex cylindrical lenses individually mounted in separate lens-cells, each of the latter lens-cells being adapted to be positioned before the eye with the same side invariably rearward and alternately in contact with the forward side of each of the aforementioned lens-cells, and the focal length of each of said convex spherical lenses and each of said convex cylindrical lenses being increased by an amount equal to the interval between the second principal point thereof and the aforesaid uniformly situated second principal point of all of said concave lenses, when said lens-cells are in contact as aforesaid.

14. Apparatus for determining refractive errors of the human eye, comprising a number of plano-concave spherical lenses and a number of plano-concave cylindrical lenses, a lens-cell for each of said concave lenses, each of said lenses being mounted in its lens-cell with their respective vertices positioned at a uniform distance from that face of the lens-cell adjacent the plano side of the lens, a number of plano-convex spherical lenses and a number of plano-convex cylindrical lenses, a lens-cell for each of said convex lenses, each of said convex lenses being adapted to be alternately combined with and forwardly of each of said concave lenses with the center of curvature of each concave lens and each convex lens in the direction of the eye and with the lens-cells in contact, each of said convex lenses having a focal plane situated at a specified dioptric distance from the uniformly positioned vertices of the several concave lenses when combined therewith in the manner aforesaid, whereby when one of said convex spherical lenses is combined as aforesaid with one of said concave spherical lenses having its focal plane situated at the same dioptric distance the resultant with be naught, and when one of said convex cylindrical lenses is combined as aforesaid with one of said concave cylindrical lenses having its focal plane situated at the same dioptric distance the resultant will be naught when said cylindrical lenses are both positioned at the same axis.

15. Apparatus for determining refractive errors of the human eye, comprising a number of concave spherical lenses, concave cylindrical lenses, convex spherical lenses and convex cylindrical lenses, means for alternately positioning each of said concave lenses before the eye with the same side invariably towards the eye, means for alternately positioning a selected one of said convex lenses anterior of each of said concave lenses with the same side of the convex lens invariably outward, means for assuring a uniform interval between the second principal point of a selected one of said convex lenses and the second principal point of each of said concave lenses with which it may be combined in the manner aforesaid, each of said convex lenses having its focal length increased by an amount equal to the aforesaid interval of that particular convex lens when combined as aforesaid, the dioptric value of each of said concave lenses being specified in terms of the dioptric distance between its focal plane and the second principal point thereof, the dioptric value of each of said convex lenses being specified in terms of the dioptric distance between its focal plan and the second principal point of any one of said concave lenses with which it may be combined as aforesaid, whereby when one of said convex spherical lenses is combined in the manner aforesaid with one of said concave spherical lenses having the same specified dioptric value the resultant will be naught, irrespective of the difference in the actual focal lengths thereof, and when one of said convex cylindrical lenses is combined in the manner aforesaid with one of said concave cylindrical lenses having the same specified dioptric value the resultant will be naught when both of said cylindrical lenses are positioned at the same axis.

ORVAL W. LEE.

CERTIFICATE OF CORRECTION.

Patent No. 2,024,376. December 17, 1935.

ORVAL W. LEE.

It is hereby certified that error appears in the above numbered patent requiring correction as follows: In the heading to the drawing and specification, title of invention, for "Diagnostic Lens" read Diagnostic Lenses; page 2, second column, line 42, after "plano-convex" insert is; page 5, second column, line 14, for "lense" read lens; page 6, first column, line 55, for "practiticnar" read practitioner; page 9, second column, line 11, claim 14, for "with" read will; and that the said Letters Patent should be read with these corrections therein that the same may conform to the record of the case in the Patent Office.

Signed and sealed this 31st day of March, A. D. 1936.

Leslie Frazer (Seal) Acting Commissioner of Patents.